(12) United States Patent
Sarkar et al.

(10) Patent No.: US 8,249,611 B1
(45) Date of Patent: Aug. 21, 2012

(54) SYSTEMS AND METHODS FOR DYNAMICALLY ADJUSTING AN ACCESS SEARCH WINDOW

(75) Inventors: Debasish Sarkar, Irvine, CA (US); Sachin Vargantwar, Overland Park, KS (US); Siddharth T. Oroskar, Overland Park, KS (US); Deveshkumar Rai, Overland Park, KS (US); Bhagwan Khanka, Lenexa, KS (US); Manoj Shetty, Overland Park, KS (US); Sandeep Goyal, Overland Park, KS (US); Anoop Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 228 days.

(21) Appl. No.: 12/572,406

(22) Filed: Oct. 2, 2009

(51) Int. Cl.
   *H04W 72/00* (2009.01)
(52) U.S. Cl. .................. 455/452.1; 455/452.2
(58) Field of Classification Search .......... 455/452, 455/452.1, 452.2
   See application file for complete search history.

(56) References Cited

U.S. PATENT DOCUMENTS

| | | | |
|---|---|---|---|
| 5,890,067 A | 3/1999 | Chang | |
| 6,081,229 A | 6/2000 | Soliman | |
| 6,161,022 A | 12/2000 | Hwang | |
| 6,223,041 B1 | 4/2001 | Egner | |
| 6,526,029 B1 | 2/2003 | Zhong | |
| 6,577,616 B1 | 6/2003 | Chaudry | |
| 6,775,252 B1 | 8/2004 | Bayley | |
| 6,970,871 B1 | 11/2005 | Rayburn | |
| 7,190,958 B1 * | 3/2007 | Yarkosky | 455/436 |
| 7,209,758 B1 | 4/2007 | Moll | |
| 7,236,796 B2 | 6/2007 | Soliman | |
| 7,328,027 B1 | 2/2008 | Mangal | |
| 7,433,682 B1 | 10/2008 | Moll | |
| 2003/0114172 A1 | 6/2003 | Soliman | |
| 2003/0190892 A1 * | 10/2003 | Shimada et al. | 455/63.1 |
| 2006/0121855 A1 | 6/2006 | Dillon | |
| 2006/0229087 A1 | 10/2006 | Davis, III | |
| 2007/0010270 A1 * | 1/2007 | Dillon | 455/513 |
| 2009/0069033 A1 * | 3/2009 | Karstens et al. | 455/456.3 |
| 2011/0058473 A1 * | 3/2011 | Krym et al. | 370/232 |
| 2011/0194444 A1 * | 8/2011 | Karstens | 370/252 |

OTHER PUBLICATIONS

Openwave, "Overview of Location Technologies," Nov. 19, 2002.
Kjellberg, Richard, "Analysis of an AIS Implementation in Tokyo Bay," undated.

* cited by examiner

*Primary Examiner* — Nathan Mitchell (57) ABSTRACT

Systems and methods for dynamically adjusting the size of an access search window are provided. In an embodiment a base station uses an access search window size, which is initially set to a default value, to determine whether to accept access requests from access terminals (ATs). The base station operates to accept access requests from ATs when the ATs are within the distance defined by the value of the access search window. The base station further operates to measure an amount of traffic for a sector of a wireless coverage area and change the value of the access search window size based on the amount of traffic on the sector.

13 Claims, 8 Drawing Sheets

SYSTEMS AND METHODS FOR DYNAMICALLY ADJUSTING AN ACCESS SEARCH WINDOW

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

A subscriber (or user) in a service provider's wireless communication system accesses the system for communication services via an access terminal, such as a cellular telephone, pager, or appropriately equipped portable computer, for instance. When an access terminal is positioned in a cell, the access terminal (also referred to herein by "AT") communicates via an RF air interface with the BTS antenna of the cell. Consequently, a communication path or "channel" is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

OVERVIEW

An AT initiates a call or data session by transmitting one or more access request messages to its serving base station. More specifically, the AT transmits a one or more "access probes" in a sequence to the base station with a random delay between each transmission in order to listen for an acknowledgement from the base station. Once the base station acknowledges an access probe, it assigns a communication channel to the AT, and a call or session setup is established using the assigned channel. If the AT does not receive an acknowledgement from the base station after transmitting all of the access probes of a given sequence, the AT may attempt access with one or more additional probe sequences as necessary until it either receives an acknowledgment and a traffic channel assignment, or the attempted access via the base station fails.

The failure of a base station to acknowledge an access probe can be due to a number of reasons, including heavy loading conditions from multiple access terminals attempting access, lack of an available traffic channel, transmission of an access probe at too low a power level for the base station to properly detect, and location of the AT at too great a distance from the base station. In practice, the AT encodes each access request using a form of timing signal that allows the base station to determine the AT's distance from the base station. The base station may then ignore the access probe if the determined distance exceeds a threshold distance, which is defined as the base station's "access search window." When an access attempt via the AT's serving base station fails, the AT may attempt access via a different base station.

Typically, a base station's access search window size is fixed, and thus any AT can gain access to that base station if it is within the distance defined by the access search window. As base stations become heavily loaded, call fidelity can decrease, and the number of dropped calls can increase.

Accordingly, embodiments of the present invention provide a method and system for enabling a base station to dynamically change the value of the access search window size based on load. In an embodiment of the invention, a base station uses an access search window, which is initially set to a default value, to determine whether to accept an access request from an AT. The base station operates to accept an access request from the AT when the AT is within the distance defined by the value of the access search window. The base station further operates to measure an amount of traffic for a sector of a wireless coverage area and change the value of the access search window based on the amount of traffic for the sector.

In another embodiment, a first base station operates to receive an access request message from an AT that is located within the distance defined by the first base station's access search window. The first base station measures the amount of traffic it is handling, and when the amount of traffic is above a threshold value, the base station determines (i) whether there is a second base station within a specified distance from the access terminal, and (ii) whether the second base station is close enough to the access terminal to accept an access request message from the access terminal. When the second base station is not close enough to the access terminal to accept an access request message from the access terminal, the first base station instructs (i) the second base station to increase the size of its access search window, and (ii) the AT to send an access request to the second base station.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are conventionally referred to as "1X-RTT" communications, also abbreviated as just "1X." Packet-data communications under IS-856 are conventionally referred to as "EV-DO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
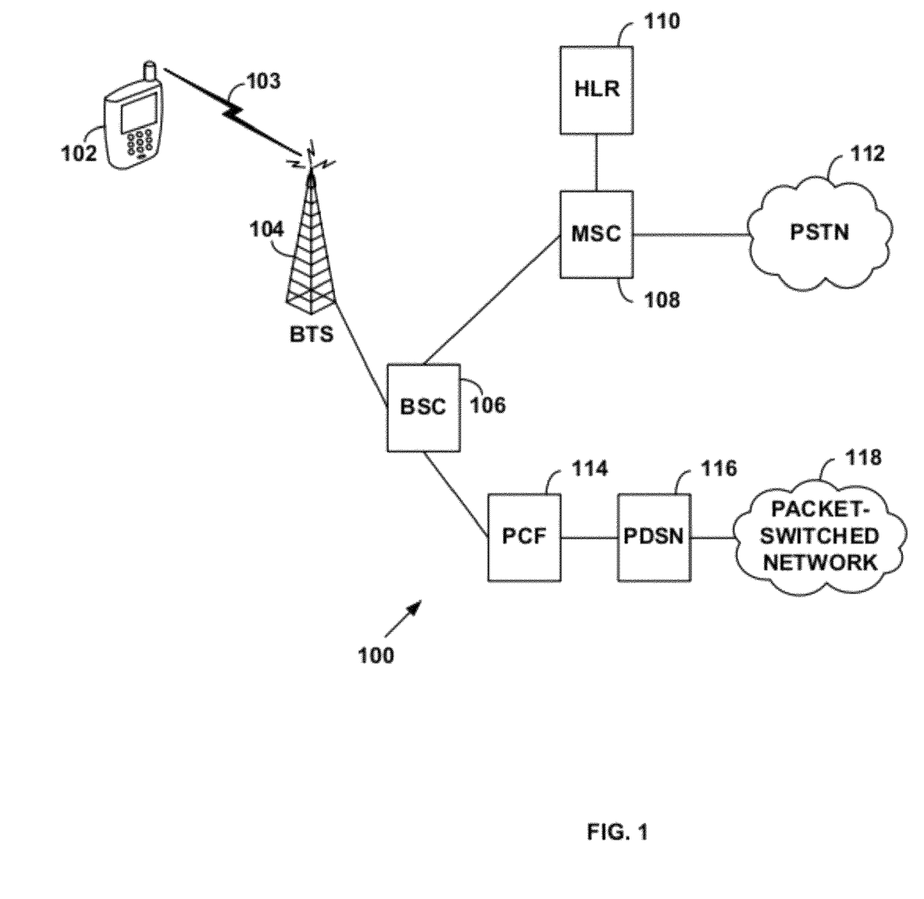
FIG. 1 is a simplified block diagram of a wireless communication system in which an example embodiment of the invention could be carried out.

FIG. 1 shows a simplified block diagram of a wireless communication system 100 that can be operated by a wireless service provider, and in which an embodiment of the invention can be employed. As shown, AT 102 communicates over an air interface 103 with a BTS 104, which is then coupled or integrated with a BSC 106. Transmissions from a BTS to an AT represent the "forward link" to the access terminal, while transmissions from an AT to a BTS represent the "reverse link."

BSC 106 is connected to MSC 108, which acts to control assignment of air traffic channels (e.g., over air interface 103), and provides access to wireless circuit-switched services such as circuit-voice and circuit-data (e.g., modem-based packet data) service. As represented by its connection to PSTN 112, MSC 108 is also coupled with one or more other MSCs, other telephony circuit switches in the operator's (or in a different operator's) network, or other wireless communication systems, thereby supporting user mobility across MSC regions, roaming between systems, and local and long-distance landline telephone services. Also connected to MSC 108 is home location register (HLR) 110, which supports mobility-related aspects of subscriber services, including dynamic tracking of subscriber registration location and verification of service privileges.

As shown, BSC 106 is also connected with a PDSN 116 by way of packet-control function (PCF) 114. PDSN 116 in turn provides connectivity with a packet-switched network 118, such as the Internet and/or a wireless carrier's private core packet-network.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary AT 102 typically comprises a user-interface, I/O components, a communication interface, a tone detector, a processing unit, and data storage, all of which may be coupled together by a system bus or other mechanism. As such, system 100, AT 102 and air interface 103 collectively are representative of examples for implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group.

By way of example, aspects of an embodiment of the present invention could be implemented in a base station that operates according to a CDMA family of protocols in a wireless communication system. In accordance with the example embodiment, the base station could use an access search window to define a distance beyond which it will not accept access requests from ATs. The access search window defines a circle centered on the base station. The access search window may define the distance using, for example, a physical distance (i.e., kilometers), or in terms of chip durations (a chip is the unit of code spreading for CDMA). In CDMA, one chip is approximately 0.8 μs in duration, and the "chip distance" is approximately 244 meters.

The access search window may initially be set to a default value. The default access search window value is generally configured as an operating parameter of the system. In use, a base station conventionally operating according to 1X-RTT or EVDO will typically ignore access requests from ATs that are situated beyond the distance defined by the access search window (the base station's determination of an AT's distance away from it is described below), and accept requests from ATs that are within the access search window. As part of the example embodiment, the base station could provide the access search window (or other form of threshold distance) to the access terminal in one or another system message, such as the Systems Parameter Message. Other messages could be used as well to provide the access search window to the AT.

Under both IS-2000 and IS-856, an access terminal in an idle state may request access from a wireless communication system, such as the one shown in FIG. 1, by transmitting one or more access request messages to its serving sector (or other form of coverage area). More specifically, each sector supports one or more "access channels" on its reverse links for receiving access requests from ATs operating in the sector.

An AT seeking access from a particular sector will transmit one or more sequences of access probes on an access channel for that sector, each sequence comprising a system-configurable number of access probe transmissions. Each successive access probe is transmitted at a higher power than the preceding one, with a random delay in between. The delay provides an interval in which the particular sector (for example, the base station) can acknowledge the previous access probe, and the random time between probe helps avoid transmission "collisions" between access probes from different ATs that are seeking access from the same particular sector during the same time frame. Upon receiving an acknowledgement from the particular sector, the AT discontinues further access probe transmissions (if any remain) in the sequence and waits for a channel assignment message from the sector. If no acknowledgement is received within the sequence, the AT may initiate one or more additional sequences of access probe transmissions until it either receives an acknowledgement (and a traffic channel), or gives up attempting to gain access from the particular sector. In the event of failure, the AT may attempt to acquire access from a different sector, using the same procedure.

An access probe comprises an identification of the access terminal seeking access, as well information specific to the nature of the request, such as the type of call or session being sought, among other possible details. Transmission of the access probe involves spreading or modulating the probe with the PN long code, chip-by-chip. As is known in the art, the PN long code is a pseudo-random sequence of binary values (typically 1s and 0s or 1s and −1s), referred to as chips, that repeats every $2^{42}-1$ values (i.e., has a period of $2^{42}-1$). It is "pseudo-random" because, while the sequence appears largely random and possesses mathematical properties characteristic of random sequences, it is generated deterministically with a fixed period.

Operationally, the PN long code is generated by clocking successive states of a 42-bit shift register ("long code register") at a rate of 1.228 Megahertz. At each clocked state, a 42-bit long code mask is applied to the register contents, and the result is summed modulo-2 to yield a single bit value. This process yields a new bit value at every clock tick (about 0.8 microseconds), and the continuous sequence of bits constitutes the sequence of chips of the PN long code thus generated chip-by-chip at the rate of 1.228 Mega-chips per second. Excluding a register state in which all the bits are zero, there are $2^{42}-1$ unique states that can be achieved before the cycle identically repeats. The generated PN long code thus repeats every $2^{42}1$ clock ticks (about 41.5 days).

At any given instant, the phase of the PN long code corresponds to which chip of the $2^{42}-1$ chip sequence is generated. In the absence of a long code mask, the phase is determined entirely by the state of the 42-bit long code register at the given instant. For the purposes of the discussion herein, a PN long code so generated (i.e., with no long code mask) shall be referred to as a "pure" PN long code. Any two registers that are in the same state at the same time are synchronized, and their generated pure PN long codes are in phase (i.e., generated with the same phase at the same time). In particular, when an access terminal "acquires the system" (e.g., when it first powers on), the RAN reports to the AT (e.g., in a Sync channel message) the current time and what the state of the long code register will be at a specific, designated time in the future (typically a few milliseconds beyond the current time). The AT then loads its long code register with the reported long code register state, and begins to clock its PN long code generation at the designated time (an exact clock tick). This procedure results in the AT synchronizing with the RAN, thereby generating its pure PN long code in phase with the RAN's (and the overall system's) pure PN long code.

Phase synchronization between the AT and the base station is required because, whereas the AT spreads transmissions to the base station on a chip-by-chip basis, the base station "de-spreads" (or decodes) the transmissions chip-by-chip as the transmissions are received in order to recover the transmitted data. Phase synchronization ensures that both sender (AT) and receiver (base station) are using the same chip sequence to spread and de-spread, respectively, the transmission.

As is known in the art, the effect of applying a long code mask to generation of the PN long code is to shift the phase of the generated PN long code with respect to the pure PN long code, without having to shift the state of the long code register (beyond the nominal clock-driven state evolution). In particular, the access channel long code mask for a given sector (or other form of coverage area) is constructed from the PN offset of the given sector, the base station ID for the sector, the access channel number, and a paging channel number. This information is transmitted from the sector to the AT in one or another system message (e.g., an Access Parameters Message and/or a System Parameters Message) after the AT synchronizes with the system. In applying a particular access channel long code mask during access attempts, the AT thus encodes (spreads) access probes with a PN long code having a phase determined by parameters specific to the particular access channel on which the AT seeks access. The particular sector uses the same access channel long code mask to de-spread (decode) the access probes, therefore generating a PN long code having the same phase as the one used by the AT. To the extent that nearby sectors have different parameters, they will have different access channel long code masks, and will thus generate PN long codes with phases different from the AT's PN long code phase; i.e., they will not recognize the AT's access requests.

Although the respective PN long codes of AT and base station are in phase when the AT transmits an access probe, there is a propagation delay between the time the probe is transmitted and when it is received at the base station (or other RAN element). Consequently, the phase of the base station's PN long code will have advanced by the time the given access probe is received. Operationally, the base station accommodates this delay by searching for signals within its access search window, which, as noted above, may be defined in terms of chips. Specifically, by looking "backward" (or "forward") in the chip sequence with respect to the base station's current phase, the base station can effectively compensate for any propagation delay suffered by an incoming signal (e.g., an access probe) transmitted at an earlier time (and phase), provided the base station searches far enough backward. Since propagation delay corresponds to a distance traveled by the transmitted signal from its source, the base station can use this propagation-induced phase shift to determine the distance to the AT. In this sense, spreading transmissions with the PN long code can be viewed as embedding a distance indicator in the transmissions. Moreover, the base station can exclude from consideration signals transmitted from ATs beyond a distance defined by the access search window. In particular, the base station can set a distance threshold such that signals originating from by the threshold distance are ignored (or otherwise not processed and/or responded to).

Accordingly, the base station may use an AT's distance either within or beyond the access search window to determine (possibly with other factors as well) whether or not to provide the requested access. Access probes originating from within the access search window can be processed, and access granted (assuming other factors, such as channel availability, allow it). However, access probes originating from beyond the access search window may be ignored, and the associated access requests denied.

The principles discussed above are illustrated by way of example in FIG. 2. At the top of FIG. 2, an AT 202 is depicted (on the left) as being located 3 km from a BTS 204 (on the right), which has an access search window of 2 km shown as a dashed circular arc. The BTS represents a cell or sector (or other form of coverage area) to which an AT might transmit an access probe in order to seek access. It will be appreciated that the 2-km access search window is an example, and that other distances (or units of measurement, such as chips), could be used. The AT's distance of 3 km from the BTS is also an example. A conceptual and abbreviated illustration of transmission of an access request 206 is shown below the AT 202 and BTS 204. As noted above, for a spreading rate of 1.228 Mega-chips per second and signal propagation at the speed of light, each chip corresponds to a distance of approximately 244 meters. For the purposes of the simplifying the arithmetic of the present illustration, the distance per chip is rounded to 250 meters, or one km for every four chips. This simplification should not be viewed as limiting with respect to the present invention or embodiments thereof.

Figure 2:
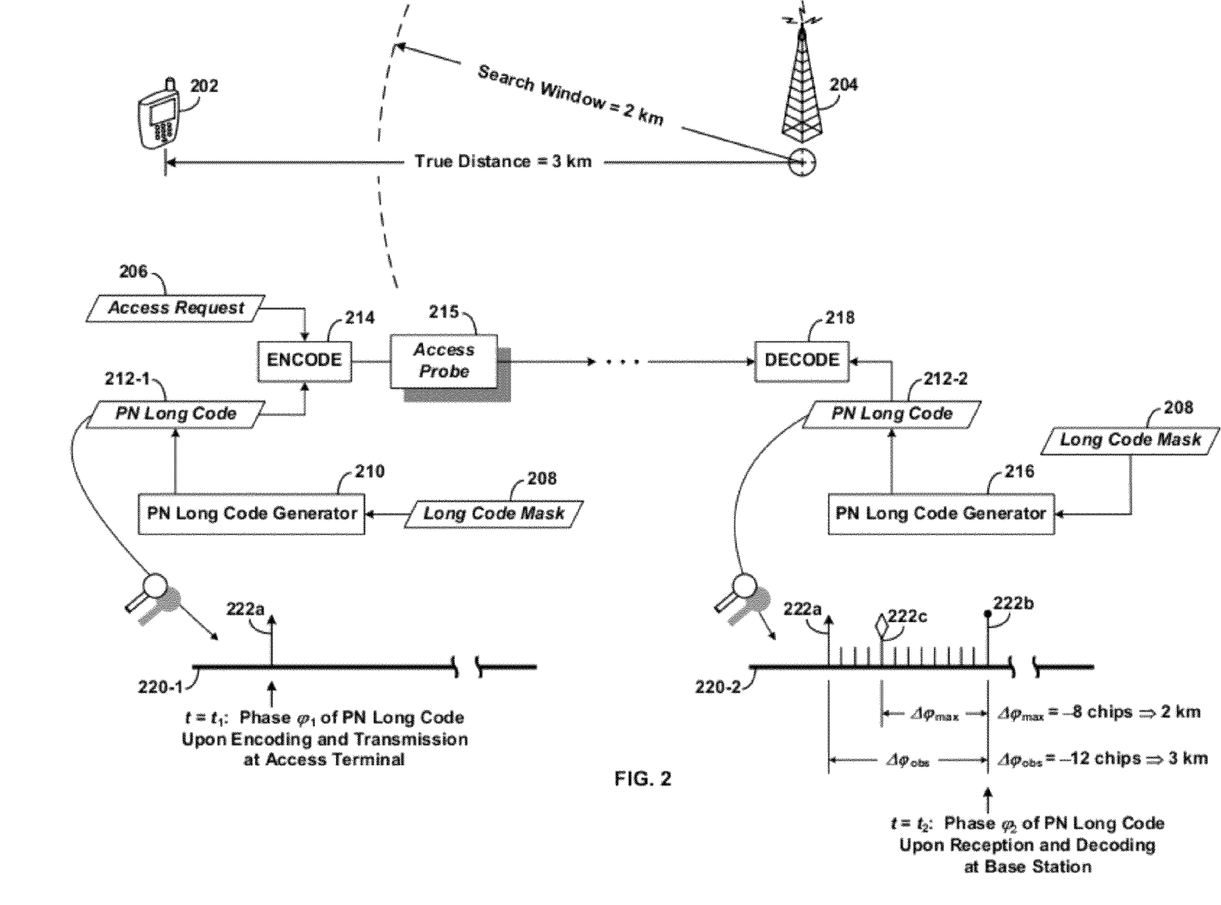
FIG. 2 depicts example operation of conventional encoding and transmitting of an access probe.

In accordance with conventional operation, an access channel long code mask 208 is applied by a PN long code generator 210 of AT 202 to generate a PN long code 212-1. The PN long code is then used to encode 214 (i.e., spread) the access request 206 to yield an access probe 215, which in turn is transmitted to the BTS 204. At the BTS, the same long code mask 208 is applied by the PN long code generator 216 to generate PN long code 212-2, which in turn is used to decode 218 (i.e. de-spread) the received access probe 215. An arrow interrupted by ellipses and pointing from access probe 215 to decode block 218 at the BTS 204 represents the transmission of the access probe, which is associated with a propagation delay corresponding to the distance (3 km) traversed by the transmission.

The effect of propagation delay on PN long code phase shift measured by the BTS is illustrated at the bottom of FIG. 2. The AT's PN long code 212-1 is depicted in a magnified view 220-1 as a horizontal line representing chip phase on the left side of the figure, while the base station's PN long code 212-2 is similarly depicted in a magnified view 220-2 on the right (magnifying glasses in FIG. 2 represent the conceptual "blow-up" of each PN long code). An upward arrow 222a marks the phase $\phi_1$ of the PN long code 220-1; its location along the chip-phase line in the present illustration is arbitrary. In accordance with conventional operation, the phase $\phi_1$ is determined by the state of the AT's PN long code register at the particular instant of time $t=t_1$ and by the long code mask 208.

A vertical line 222b with a dot at the top marks the phase $\phi_2$ of the base station's PN long code 220-2 upon reception of the access probe at time $t=t_2$. In accordance with conventional operation, the phase $\phi_2$ is determined by the long code mask 208 and the state of the BTS's PN long code register at time $t=t_2$. The magnified view 220-2 also includes line 222a marking phase $\phi_1$ (at time $t=t_1$) for reference, as well as tick marks at each intervening chip between lines 222b and 222a. In the present example, the propagation delay $\Delta t = t_2 - t_1$ gives rise to an observed phase shift of $\Delta\phi_{obs} = \phi_2 - \phi_1 = -12$ chips over the 3 km distance (assuming the approximation of 250 meters per chip). That is, the clock (and the PN long code phase) has advanced 12 ticks (one chip per tick) over time interval $\Delta t$. Finally, a vertical, diamond-topped line 222c marks a maximum allowed phase delay $\Delta\phi_{max} = -8$ chips with respect to $\phi_2$, corresponding propagation of a hypothetical signal across a distance equal to the access search window (2 km in the present example).

In further accordance with conventional operation, the BTS 204 (or other RAN element) will ignore (or otherwise deny) the access probe 215 from AT 202 because the access terminal was beyond the access search window when it transmitted the access probe. As described above, the BTS could either directly compute the AT's distance and compare it to the access search window, or the BTS could use a search window that excludes decoding any signals having phase shifts greater (i.e., more negative) than $\Delta\phi_{max} = -8$ chips (for this example), and therefore originating from beyond the access search window.

Figure 3:
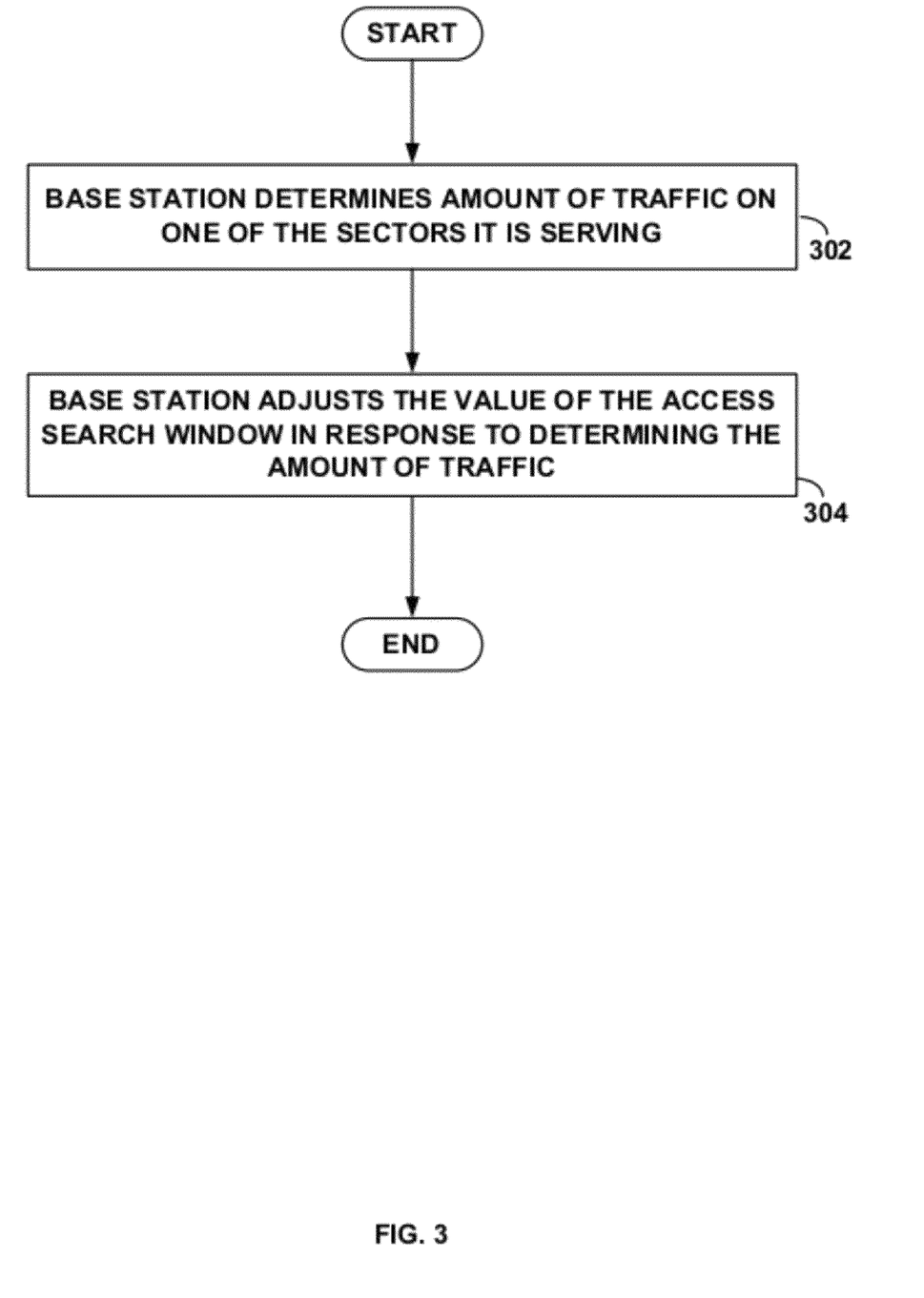
FIG. 3 is a flowchart of a method, in accordance with an embodiment of the invention.

FIG. 3 is a flow chart of a method, in accordance with an embodiment of the invention. Generally, FIG. 3 depicts a method of a base station modifying the value of the access search window for a sector in a wireless coverage area based on the amount of traffic in that sector. As shown in FIG. 3, at step 302, a base station determines the amount of traffic on one of the sectors it is serving. There are several ways in which the base station can determine the amount of traffic on the sector. For example, the base station could maintain a tally of the number of ATs currently being served by the sector (the more ATs that serve the sector, the heavier the traffic). As another example, the base station could measure its forward power (the greater the forward power, the heavier the traffic). As yet another example, the base station could measure the reverse noise rise (RNR) in the sector (the higher the RNR, the heavier the traffic). As yet another example, the amount of traffic could be determined by measuring the number of dropped calls on the sector (the more dropped calls, the heavier the traffic).

At step 304, in response to determining the amount of traffic, the base station adjusts the value of the access search window. For example, the base station could compare the amount of traffic to one or more threshold values, and change the access search window based on those threshold values. The threshold values may be supplied by the network operator. As shown in the table below, the heavier the traffic, the smaller the value of the access search window:

| Traffic (% of Maximum Threshold) | Search Window (% of Maximum) |
|---|---|
| 0% | 100% |
| 10% | 95% |
| 20% | 90% |
| 30% | 85% |
| 40% | 80% |
| 50% | 75% |
| 60% | 70% |
| 70% | 65% |
| 80% | 60% |
| 90% | 55% |
| 100% | 50% |

The table above is merely an example of how a base station could change its access search window. It should be understood that other values could be used as well depending on numerous factors (such as the number of ATs the base station can serve, the base station's maximum forward power, etc.).

In addition to changing the amount of traffic based on the current amount of traffic in the sector, described above, the base station may change the access search window size based on a historical amount of traffic for the sector. For example, the base station could determine the average traffic in the sector at a specific time over the previous week, compare that average traffic to a threshold value, and change the access search window size when the average traffic is −16-greater than the threshold value. For instance, the base station could take and store measurements of the amount of traffic in the sector over a period of time (i.e., for a number of days), select a subset of the stored measurements (in this example, 5:00 pm-6:00 pm for the last seven Fridays), and determine the average traffic for the sector at that time. The base station would then compare that average value to a threshold value, and reduce the access search window size for the upcoming Friday from 5:00 pm-6:00 pm if the average traffic is greater than a threshold value. Similarly, the base station could increase the access search window size when the average traffic during that time period is below a threshold value.

Figure 4:
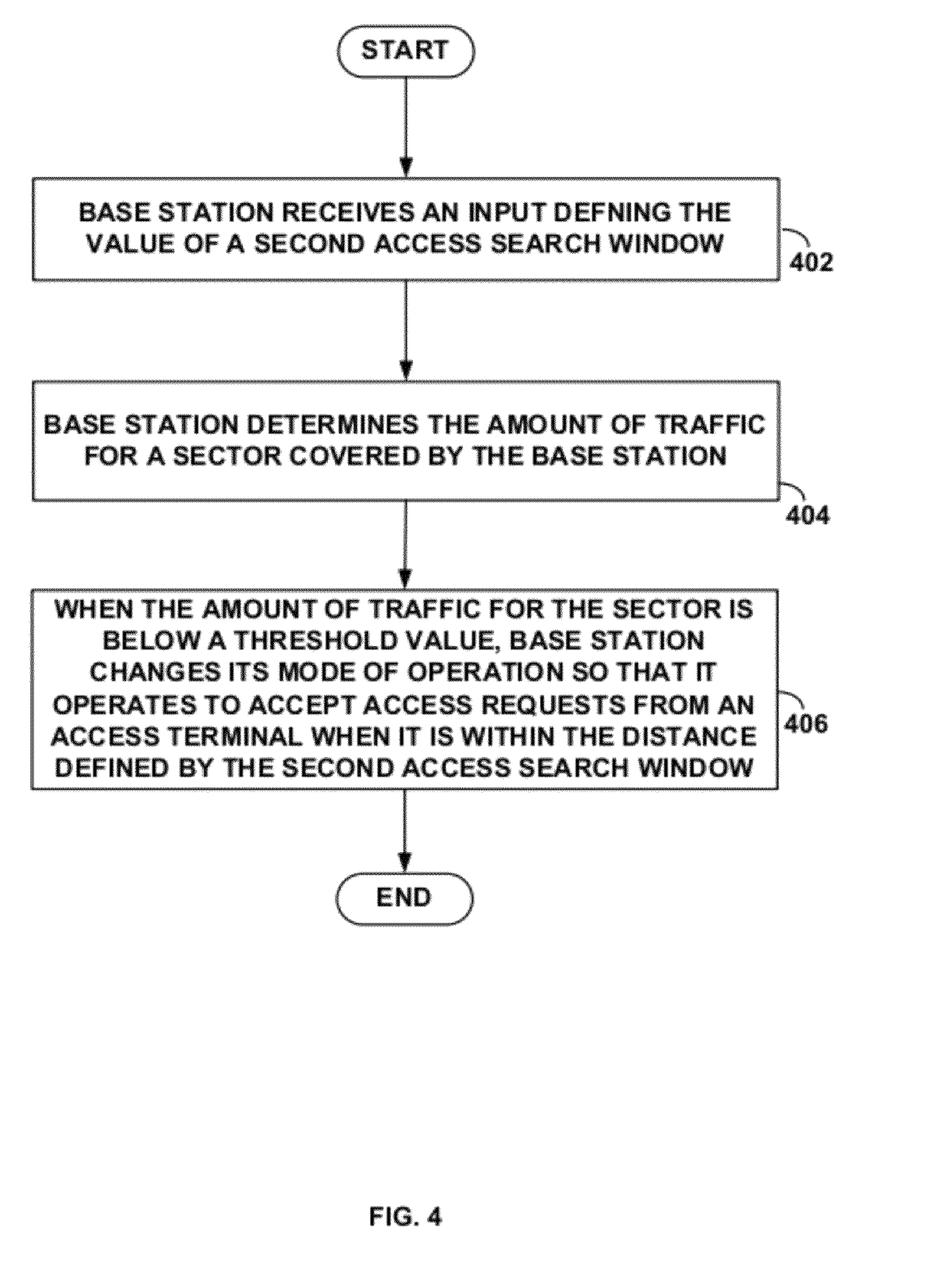
FIG. 4 is a flowchart of a method, in accordance with an embodiment of the invention.

FIG. 4 is a flow chart of a method, in accordance with an embodiment of the invention. Generally, FIG. 4 depicts a method of a base station maintaining two access search windows, and selecting between the two windows based on the amount of traffic in the sector. In the method described in FIG. 4, the base station initially operates using a first access search window, and will not accept access request messages from ATs that are beyond the distance defined by the first access search window. As shown in FIG. 4, at step 402, the base station receives an input that defines the value of a second access search window. The value of the second access search window is greater than the value of the first access search window. The value of the second search window is typically received from a network operator. At step 404, the base station determines the amount of traffic for a sector covered by the base station. The base station may determine the amount of traffic using (for example, using the methods described above with respect to FIG. 3). At step 406, the base station compares the amount of traffic to a threshold value. When the amount of traffic for the sector is below the threshold value, the base station changes its mode of operation so that it operates to accept access requests from the access terminal when the access terminal is within the distance defined by the value of the second access search window.

Figure 5:
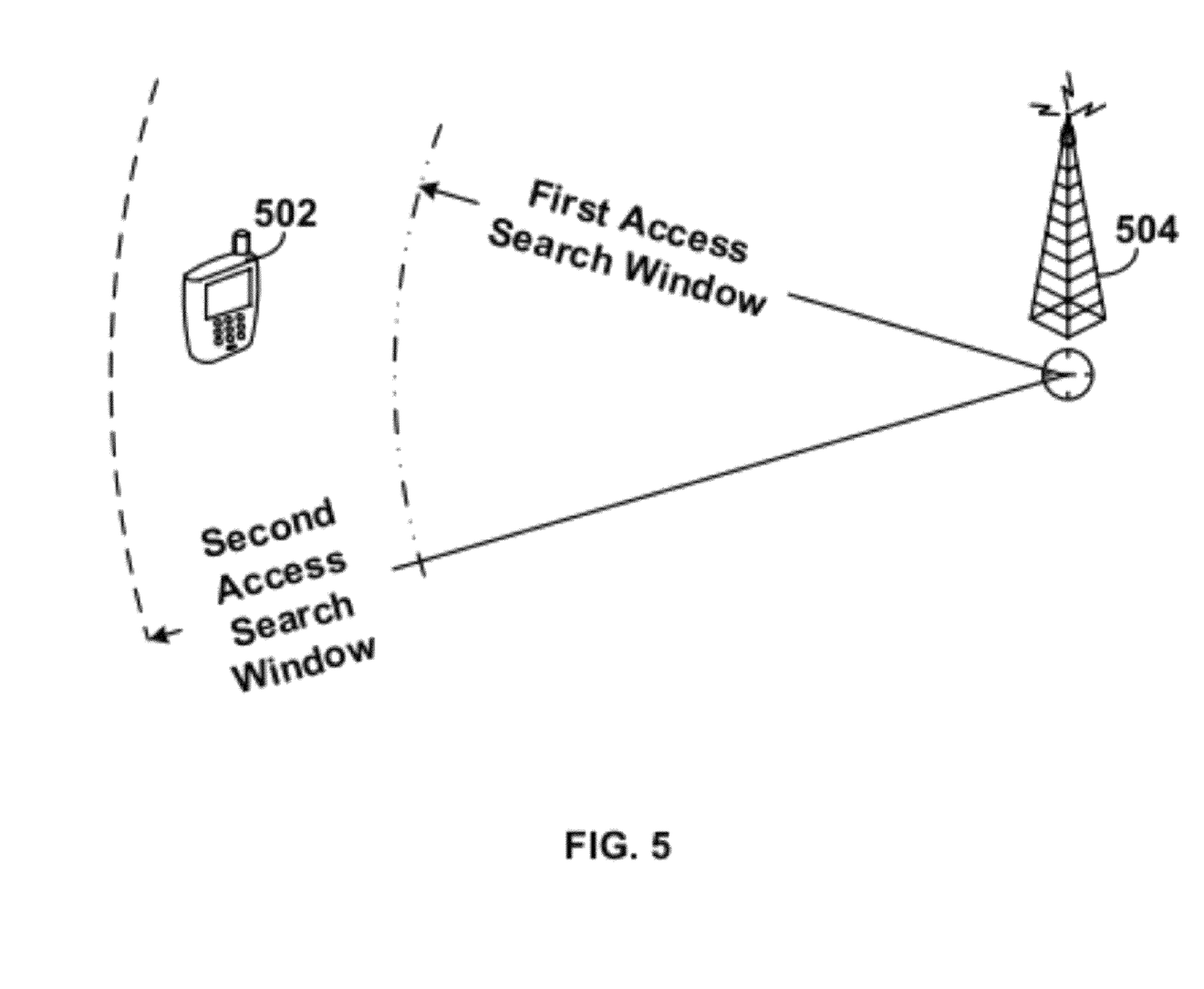
FIG. 5 is a simplified block diagram of a wireless communication system in which an example embodiment of the invention could be carried out.

Additional benefits to providing a base station with a first and a second access search window are set forth in FIG. 5. For example, assume base station 504 is operating under the first access search window (i.e., base station 504 will reject an access request made from an AT beyond the distance defined by the first access search window), and that AT 502 is located in-between the distance defined by the first and second access search windows. Further assume that AT 502 sends an access request to base station 504. Because base station 504 is operating using the first access search window, it will not accept the access request from the mobile. Consequently, under protocols such as CDMA, AT 502 will continue to send access request messages at higher levels of power. This will drain the battery power of AT 502, and increase the amount of noise in the sector served by base station 504. To alleviate this problem, if base station 504 is operating using the first access search window and receives an access request message from AT 502 while AT 502 is between the distance defined by the primary and second access search windows, base station 504 may send a message to AT 502 instructing it to stop sending access request messages to base station 504 for a specified period of time (for example, one minute). This will aid in conserving AT 502's battery life and reduce noise in the sector.

Figure 6:
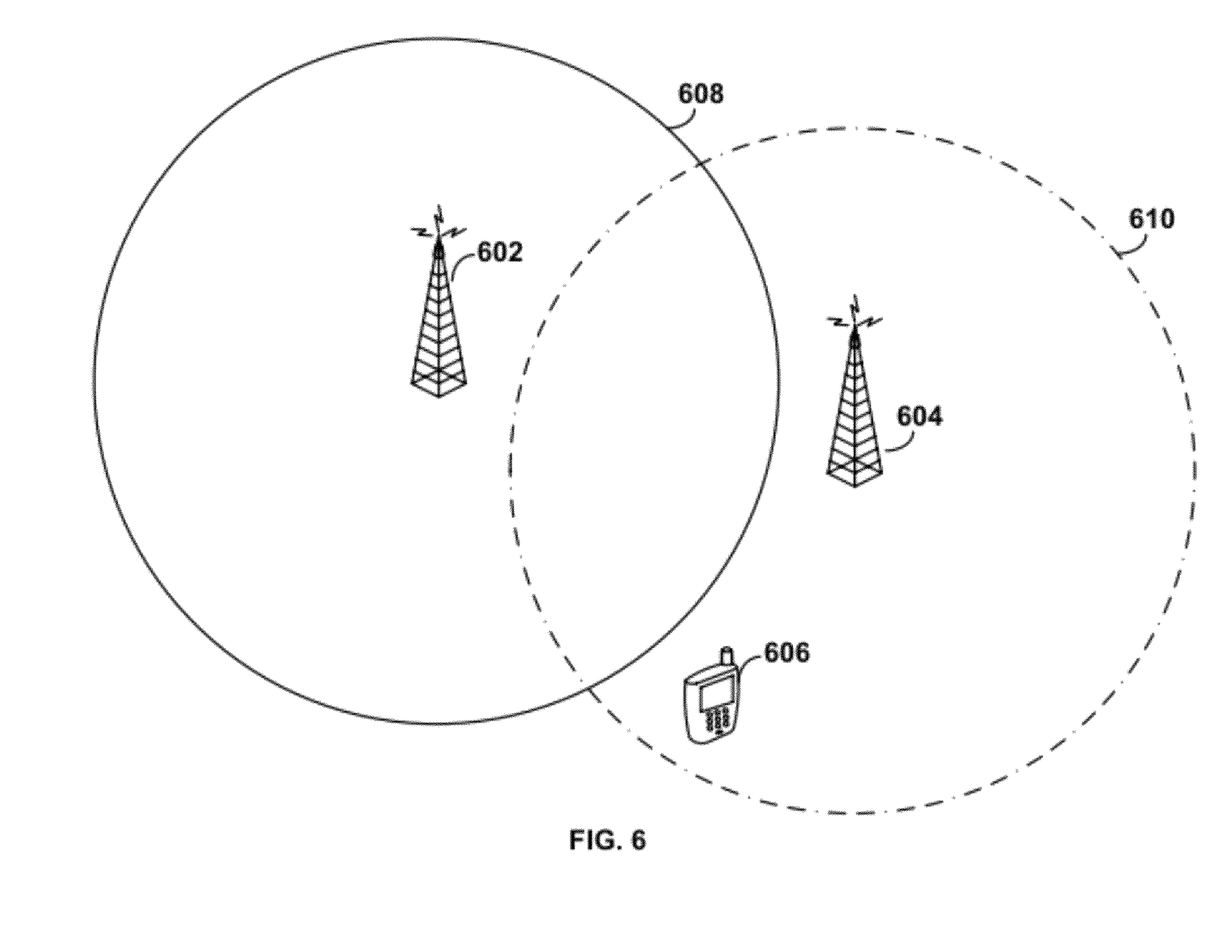
FIG. 6 is a simplified block diagram of a wireless communication system in which an example embodiment of the invention could be carried out.

FIG. 6 shows a simplified block diagram of a wireless communication system in which an embodiment of the invention can be employed. As shown in FIG. 6, base station 602 operates to accept access request messages from ATs located within access search window 608. Base station 604 operates to accept access request messages sent from ATs located within access search window 610. AT 606 is shown as being within access search window 610, but not within access search window 608. Accordingly, AT 606 can obtain access from base station 604, but not base station 602.

Figure 7:
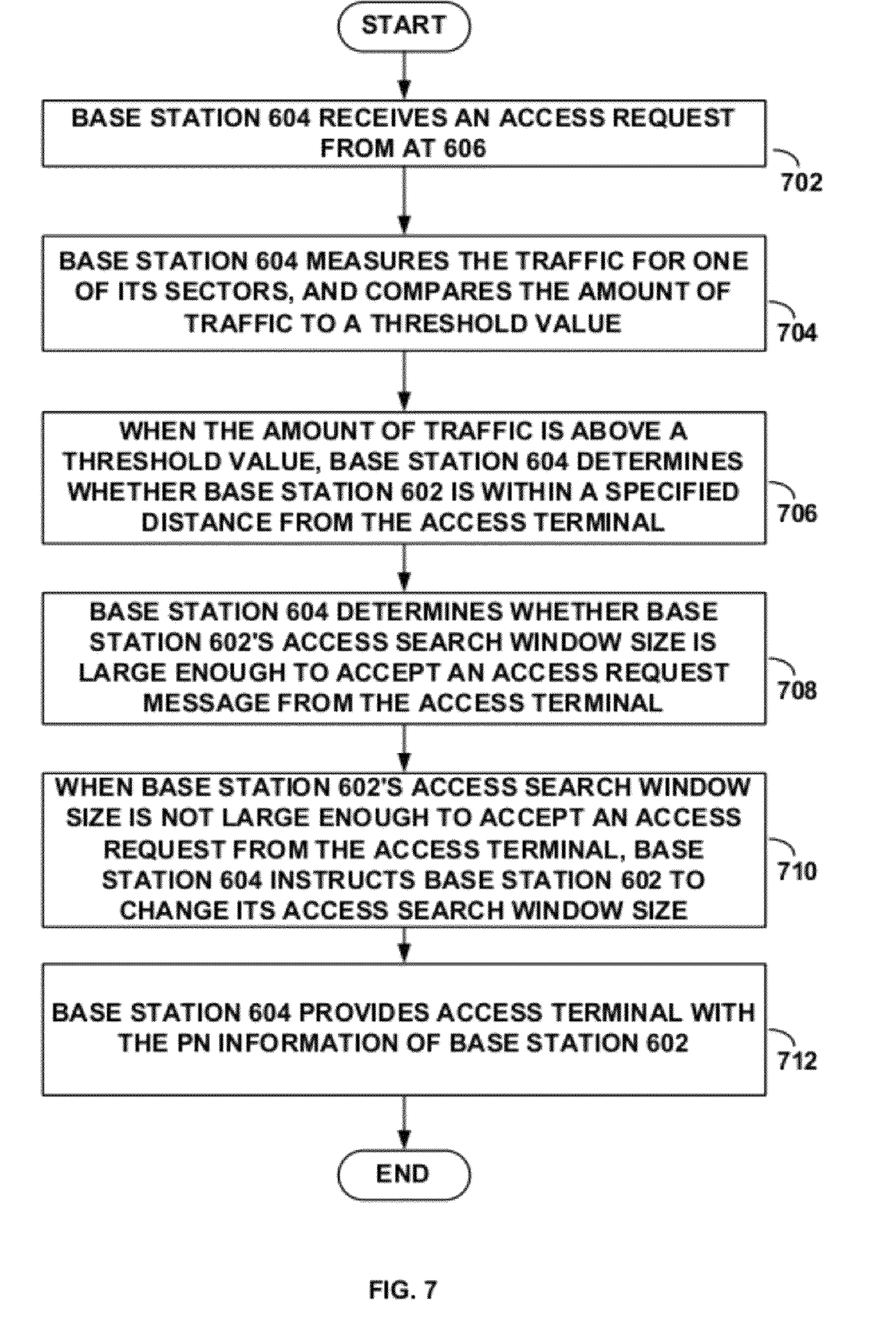
FIG. 7 is a flowchart of a method, in accordance with an embodiment of the invention.

FIG. 7 is a flow chart of a method in accordance with an embodiment of the invention. Generally, FIG. 7 depicts a method of in which base station first base station 604 causes base station 602 to change the value of its access search window based on the amount of traffic on one of base station 604's sectors, thus allowing AT 606 to gain access to base station 602. As shown in FIG. 7, at step 702, base station 604 receives an access request message from AT 606. At step 704, base station 604 measures the amount of traffic for one of its sectors (for example, using the methods described above with respect to FIG. 3), and compares the amount of traffic to a threshold value. At step 706, when the amount of traffic is above the threshold value, base station 604 determines whether base station 602 is within a specified distance from the access terminal. Base station 604 could maintain a list of base stations near it (such as base station 602), and those base stations' coordinates. This list could be provided by a network operator. Base station 604 could then triangulate the distance from AT 606 and base station 602. And other methods of determining locations (e.g. GPS) could be used as well.

At step 708, base station 604 determines whether base station 602's access search window size is large enough so that it can accept an access request message from AT 606. Base station 604 could obtain this information by sending a request message to base station 602 to obtain its access search window size. At step 710, when the when base station 602's access search window size is not large enough to accept an access request from the access terminal, base station 604 instructs base station 602 to change its access search window so that it can accept an access request from AT 606. Upon receipt of the instruction, base station 602 could simply accept the instruction. Alternatively, base station 602 could accept the instruction when the amount of traffic for base station 602 is below a threshold value. At step 712, base station 604 responds to the access request sent from AT 606 by providing AT 606 with the PN information of base station 602, thus allowing it to send an access request to base station 602.

Figure 8:
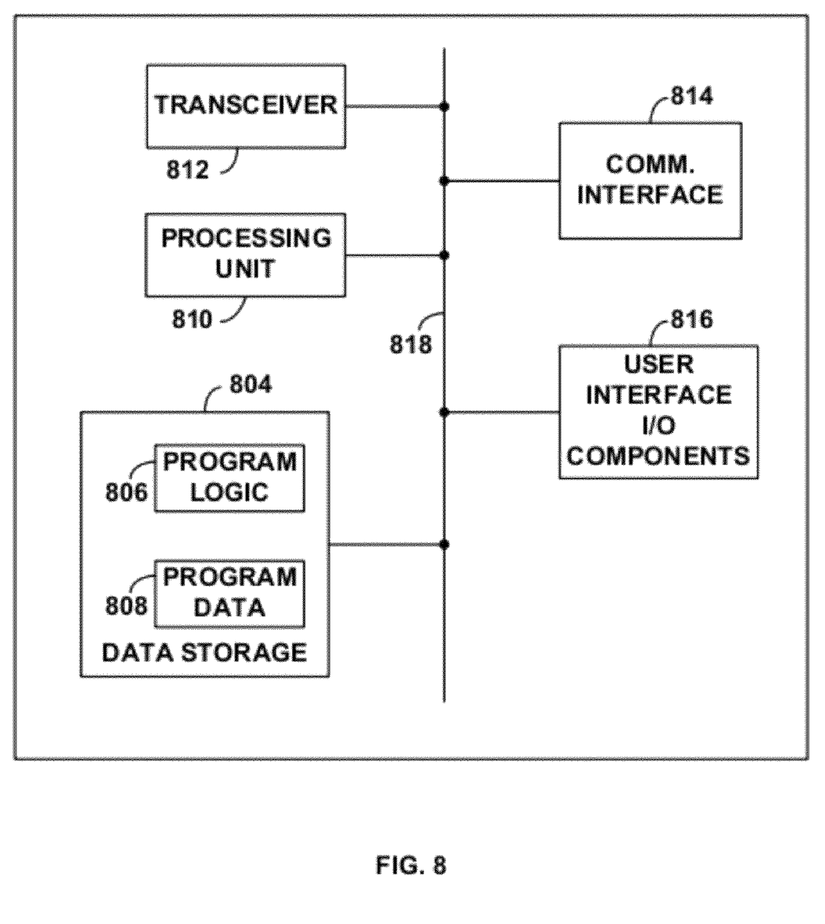
FIG. 8 is a simplified block diagram of an exemplary base station.

FIG. 8 is a simplified block diagram depicting functional components of an example base station. As shown in FIG. 8, the example base station includes data storage 804, processing unit 810, transceiver 812, communication interface 814, and user-interface I/O components 816, a system bus 818 or other mechanism.

These components may be arranged to support conventional operation in a wireless communication network that is compliant with a CDMA family of protocols, such as network 100 illustrated in FIG. 1. The details of such an arrangement and how these components function to provide conventional operation are known in the art, and are not described further herein.

Communication interface 814 in combination with transceiver 812, which may include one or more antennas, supports forward and reverse link channels for communications with the network, including receiving and responding to of access request messages, and the transmission and reception of various system messages discussed above that convey access request information, synchronization information, BTS location information, and access search window information. Interface 814 also incorporates support for reception of the PN long code in accordance with the example embodiment. The communication interface may include a module, such as an MSM™-series chipset made by Qualcomm Inc. of San Diego, Calif., and supports wireless packet-data communications according to a CDMA family of protocols.

Processing unit 810 comprises one or more general-purpose processors (e.g., INTEL microprocessors) and/or one or more special-purpose processors (e.g., dedicated digital signal processor, application specific integrated circuit, etc.). In turn, the data storage 804 comprises one or more volatile and/or non-volatile storage components, such as magnetic or optical memory or disk storage. Data storage 804 can be integrated in whole or in part with processing unit 810, as cache memory or registers for instance. Data storage 804 may be configured to hold both program logic 806 and program data 808.

Program logic 806 may comprise machine language instructions that define routines executable by processing unit 810 to carry out various functions described herein. For example, the program logic, communication interface, and transceiver may operate cooperatively to carry out logical operation such as that discussed above and illustrated in FIGS. 3, 4, and 7. Further, program data 808 may be arranged to store algorithms for determining and comparing distances as described above, as well as storing traffic information for a sector over a period of time. Program data 808 could also comprise storage for various parameters of the method (e.g., access search window size, etc.), also discussed above.

An exemplary embodiment has been described above. Those skilled in the art will understand, however, that changes and modifications may be made to this embodiment without departing from the true scope and spirit of the invention, which is defined by the claims.

We claim:

1. A method carried out by a base station that uses a first access search window to determine whether to accept an access request from an access terminal, wherein (i) the value of the first access search window defines a distance extending from the base station, (ii) the first access search window is initially set to a default value, and (iii) the base station operates to accept access requests from access terminals when the access terminal is within the distance defined by the value of the first access search window, the method comprising:

the base station measuring an amount of traffic for a sector of a wireless coverage area, and the base station changing the value of the first access search window based on the amount of traffic for the sector, wherein the amount of traffic for the sector is a current amount of traffic for the sector of the wireless coverage area, and wherein the base station measuring the amount of traffic for the sector further comprises (i) the base station storing measurements of the amount of traffic for the sector over a plurality of days, (ii) the base station selecting a subset of the stored measurements, and (iii) the base station determining an average value of the stored measurements; and wherein the base station changing the value of the first access search window based on the value of the amount of traffic comprises (i) the base station comparing the average value to a threshold value, and (ii) the base station reducing the value of the first access search window when the average value exceeds the threshold value.

2. The method of claim 1, wherein the average value is indicative of the average amount of traffic for the sector of the wireless coverage area for a specific hour of a specific day of the week.

3. A method carried out by a base station that uses a first access search window to determine whether to accept an access request from an access terminal, wherein (i) the value of the first access search window defines a distance extending from the base station, (ii) the first access search window is initially set to a default value, and (iii) the base station operates to accept access requests from access terminals when the access terminal is within the distance defined by the value of the first access search window, the method comprising:

the base station measuring an amount of traffic for a sector of a wireless coverage area the base station changing the value of the first access search window based on the amount of traffic for the sector; and the base station receiving an input, wherein the input defines a value for a second access search window, and wherein the value of the second access search window is greater than the value of the first access search window;

wherein the base station changing the value of the first access search window based on the amount of traffic for the sector comprises:

when the amount of traffic for the sector is below a threshold value, the base station changing its mode of operation so that it operates to accept access requests from access terminals when the access terminals are within the distance defined by the value of the second access search window.

4. The method of claim 3, further comprising:

the base station receiving an access request from the access terminal when (i) the access terminal is within the distance defined by the second access window, (ii) the access terminal is beyond the distance specified by the first access search window, and (iii) the amount of traffic for the sector is not below the threshold value;

the base station responsively instructing the access terminal to stop sending further access request messages to the base station for a specified period of time.

5. A method carried out by a base station that uses a first access search window to determine whether to accept an access request from an access terminal, wherein (i) the value of the first access search window defines a distance extending from the base station, (ii) the first access search window is initially set to a default value, and (iii) the base station operates to accept access requests from access terminals when the access terminal is within the distance defined by the value of the first access search window, the method comprising:

the base station measuring an amount of traffic for a sector of a wireless coverage area and the base station changing the value of the first access search window based on the amount of traffic for the sector, wherein the base station measuring an amount of traffic for the sector of the wireless coverage area comprises the base station measuring a number of dropped calls for the sector of the wireless coverage area.

6. The method of claim 5, wherein the base station changing the value of the access search window size based on the amount of traffic for the sector comprises the base station reducing the value of the access search window size when the number of dropped calls exceeds a threshold value.

7. The method of claim 5, wherein the base station changing the value of the access search window size based on the amount of traffic for the sector further comprises the base station increasing value of the access search window size when the number of dropped calls is below a threshold value.

8. A base station comprising:

a communication interface;

a processing unit;

data storage; and program logic stored in the data storage and executable by the processing unit to:

use an access search window size to determine whether to accept access requests from access terminals, wherein the access search window size is initially set to a default value;

accept access requests from access terminals when the access terminals are within the distance defined by the value of access search window size;

measure an amount of traffic for a sector of a wireless coverage area and change the value of the access search window size based on the amount of traffic for the sector wherein the amount of traffic for the sector is a current amount of traffic for the sector of the wireless coverage area, and wherein the program logic stored in the data storage and executable by the processing unit to change the value of the access search window size based on the amount of traffic for the sector further comprises program logic stored in the data storage and executable by the processing unit to (i) store measurements of the amount of traffic for the sector over a plurality of days, (ii) select a subset of the stored measurements, and (iii) determine an average value of the stored measurements; and wherein the program logic stored in the data storage and executable by the processing unit change the value of the access search window size based on the amount of traffic for the sector further comprises program logic stored in the data storage and executable by the processing unit to (i) compare the average value to a threshold value, and (ii) reduce the value of the access search window size when the average value exceeds the threshold value.

9. The base station of claim 8, wherein the average value is indicative of the average amount of traffic for the sector of the wireless coverage area for a specific hour of a specific day of the week.

10. A base station comprising:
a communication interface;
a processing unit;
data storage; and
program logic stored in the data storage and executable by the processing unit to:
use an access search window size to determine whether to accept access requests from access terminals, wherein the access search window size is initially set to a default value;
accept access requests from access terminals when the access terminals are within the distance defined by the value of access search window size;
measure an amount of traffic for a sector of a wireless coverage area
change the value of the access search window size based on the amount of traffic for the sector;
receive an input, wherein the input defines a value for a second access search window, and wherein the value of the second access search window is greater than the access search window; and
wherein the program logic stored in the data storage and executable by the processing unit to change the value of the access search window size based on the amount of traffic for the sector further comprises program logic stored in the data storage and executable by the processing unit to:
change the base station's mode of operation so that the base station operates to accept access requests from access terminals when the access terminals are within the distance defined by the value of the second access search window.

11. The base station of claim 10, wherein the program logic is further executable by the processing unit to:
in response to receiving an access request message from the access terminal, instruct the access terminal to stop sending access requests to the base station for a specified period of time when (i) the access terminal is within the distance defined by the value of second access search window size, (ii) the access terminal is beyond the distance defined by the value of the access search window size, and (iii) the amount of traffic for the sector is not below the threshold value.

12. A base station comprising:
a communication interface;
a processing unit;
data storage; and
program logic stored in the data storage and executable by the processing unit to:
use an access search window size to determine whether to accept access requests from access terminals, wherein the access search window size is initially set to a default value;
accept access requests from access terminals when the access terminals are within the distance defined by the value of access search window size;
measure an amount of traffic for a sector of a wireless coverage area and
change the value of the access search window size based on the amount of traffic for the sector
wherein the amount of traffic for the sector is a number of dropped calls for the sector of the wireless coverage area.

13. The base station of claim 12, wherein the program logic stored in the data storage and executable by the processing unit to change the value of the access search window size based on the amount of traffic for the sector comprises program logic stored in the data storage and executable by the processing unit to:
reduce the value of the value of the access search window size when the number of dropped calls exceeds a threshold value.

* * * * *